May 16, 1950 H. J. BENDER 2,508,137
ELECTRIC MOTOR
Filed March 13, 1948
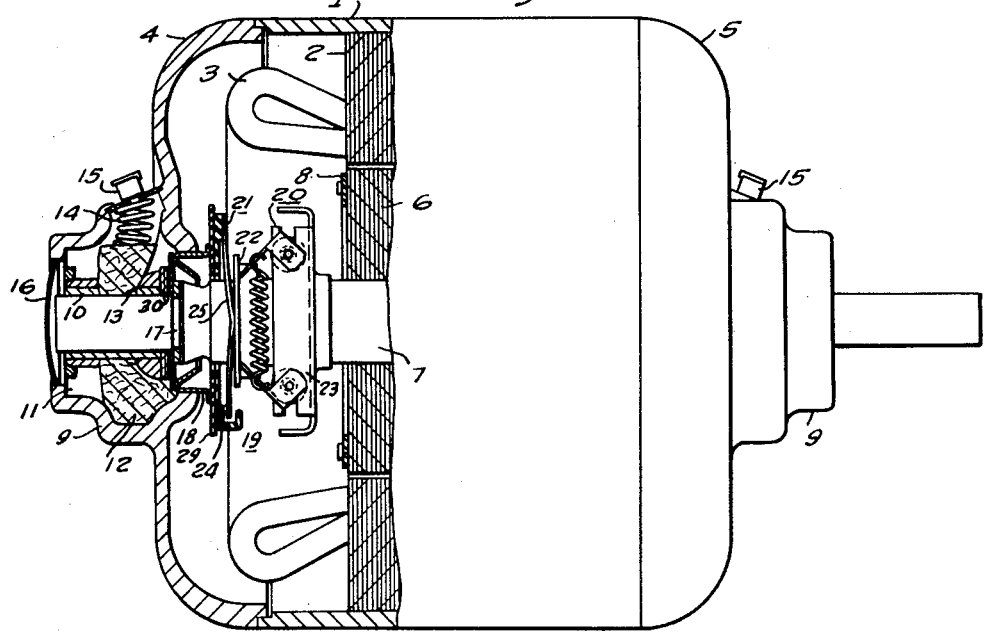
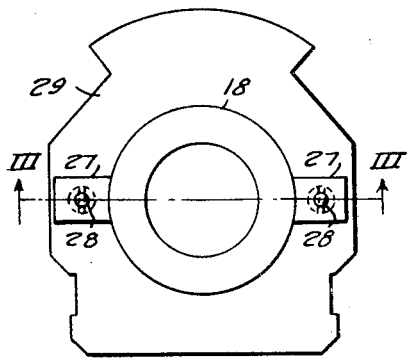
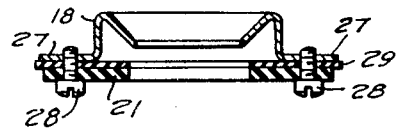
WITNESSES:
INVENTOR
Henry J. Bender.
BY
ATTORNEY Patented May 16, 1950

2,508,137

UNITED STATES PATENT OFFICE 2,508,137

ELECTRIC MOTOR

Henry J. Bender, Lima, Ohio, assignor to Westinghouse Electric Corporation, East Pittsburgh, Pa., a corporation of Pennsylvania Application March 13, 1948, Serial No. 14,659

5 Claims. (Cl. 172—36)

The present invention relates to electric motors and, more particularly, to the construction of electric motors of the type which have an internally mounted switch, or other control device.

Certain types of electric motors, such as single-phase induction motors of the capacitor-start and split-phase types, utilize a speed-responsive switch for disconnecting a starting winding when the motor has accelerated to a predetermined speed, or for effecting other circuit changes when the motor passes from the starting to the running condition. These switches, which are usually of the centrifugal type, are mounted inside the motor, and consist of a rotating part, which is mounted for rotation with the rotor, and a stationary part, which is mounted inside the end bracket of the motor in position to cooperate with the rotating part. In the conventional practice, the stationary part of the switch has been attached directly to the inside surface of the end bracket by means of screws. This required drilling and tapping holes in the bracket for the mounting screws, and also required mounting the stationary switch part on the bracket as a separate assembly operation prior to assembling the bracket on the motor.

The principal object of the present invention is to provide an electric motor of a type having an internally mounted switch, or other control device, in which no drilling or tapping of the motor end bracket for the switch is required, and in which the separate operation of assembling the switch on the bracket is eliminated, thus effecting a material reduction in cost.

A further object of the invention is to provide an electric motor of a type having an internally mounted switch, or other control device, in which a stationary part of the switch is mounted on the bearing cap member which is utilized to seal the motor bearing against escape of lubricant or entrance of dirt, instead of being mounted directly on the end bracket. In electric motors of the type under consideration, oil-lubricated bearings are usually used, which are mounted in the end bracket and provided with a sealing member or cap at the inner end of the bearing to seal it against escape of lubricant, which might otherwise get into the interior of the motor. In accordance with the present invention, this cap member or sealing means is utilized for supporting the stationary part of the speed-responsive switch, so that it is not supported directly on the bracket and can be put in place simultaneously with the bearing cap. In this way, the operations of drilling and tapping the bracket for switch mounting screws, and of separately assembling the switch part on the bracket, are eliminated, effecting a substantial reduction in the cost of the motor.

Other objects and advantages of the invention will be apparent from the following detailed description, taken in connection with the accompanying drawing, in which:

Figure 1 is a view, partly in elevation and partly in longitudinal section, showing an electric motor embodying the invention;

Fig. 2 is an end view of the assembled bearing cap and switch member; and

Fig. 3 is a sectional view approximately on the line III—III of Fig. 2.

The invention is shown in the drawing embodied in a single-phase induction motor having a frame 1 in which is supported a laminated stator core 2 carrying primary windings 3 of any suitable or usual type. The frame 1 is closed at its ends by end brackets 4 and 5. The motor also has a rotor member which includes a laminated rotor core 6 mounted on a shaft 7 and carrying a squirrel-cage secondary winding 8.

Each of the end brackets 4 and 5 has a central bearing housing or boss 9 in which is mounted a sleeve bearing 10 for the shaft 7, the bearing being supported in a central, tubular extension of the end bracket within the boss 9. The bearing housing 9 has an annular chamber 11 surrounding the bearing for the reception of lubricant, such as oil, and the oil is supplied to the bearing surface by means of wicking 12 packed in the annular space 11 and held in contact with the shaft, through a window 13 in the bearing, by means of a spring 14. An oil hole is preferably provided above the spring 14 and closed by a closure and oil cup 15 of any suitable type through which oil may be added to the bearing. The bearing housing 9 at one end of the motor, shown as the left-hand end, may be closed by a cap or plate 16, while the shaft 7 extends through the bearing housing 9 at the opposite end of the motor.

Since the oil with which the bearing 10 is lubricated will escape from the ends of the bearing, it is necessary to prevent this oil from entering the interior of the motor, and, for this purpose, the shaft 7 is formed with an oil thrower shoulder 17 adjacent the bearing, and a sealing member or cap 18 is provided. The bearing cap 18 may be formed of sheet metal and has a cylindrical portion and a central conical portion with an opening surrounding the shaft. The bearing cap 18 is pressed into place in the central opening of the end bracket 4 against a washer or washers 30 which are disposed between the bearing and the oil thrower shoulder 17, as many washers being provided as may be required to adjust the end play of the shaft 7. Oil escaping from the bearing is thrown off the shaft by the shoulder 17 and is caught by the cap 18 to prevent its getting into the interior of the motor, the oil caught in this manner draining back to the chamber 11 from which it may be returned to the bearing by the wicking 12.

The motor is also provided with a speed-responsive switch device 19, which includes a rotating part 20 and a stationary part 21. The switch 19 may be of any suitable or usual construction, and has been shown as a more or less standard type of centrifugal switch, such as is commonly used in single-phase induction motors of the capacitor-start and split-phase types. As shown, the rotating part 20 of the switch is pressed on the shaft 7 to rotate with the rotor and includes an axially movable slider 22, which is moved toward the rotor by weight bars carried on the body 23 of the switch when the motor has accelerated to a predetermined speed. The stationary part 21 of the switch includes an insulating base which has a central opening providing a small clearance around the shaft 7. A spring member 25 is secured on the base 21, and cooperating contacts 24 are carried on the base 21 and on the spring member 25, and connected in the motor circuit in any desired or usual way.

The stationary part 21 of the switch is positioned with respect to the rotating part 20 so that when the motor is at rest, or running at low speed, the slider 22 engages the spring 25 to hold the contacts 24 closed, as shown in the drawing. When the motor has reached the predetermined speed for which the switch 19 is adjusted, the slider 22 moves axially away from the stationary member and permits the spring 25 to open the contacts. It will be understood, of course, that although a specific type of switch has been shown and described for the purpose of illustration, the invention is not restricted to the use of any particular kind of switch, but includes any internally mounted switch or control device having a stationary part which is to be mounted inside the end bracket 4 of the motor.

In the conventional construction of motors of this type, it has been customary to mount the stationary part 21 of the switch 19 directly on the inner surface of the end bracket 4. This has necessitated drilling and tapping holes in the end bracket for the reception of mounting screws, and the stationary part 21 of the switch then had to be mounted in the end bracket in a separate operation prior to the assembly of the end bracket on the motor. In accordance with the present invention, these operations are eliminated by mounting the stationary part 21 on the bearing cap 18 instead of directly on the bracket 4. This may readily be done by providing the bearing cap 18 with laterally extending ears or lugs 27 to which the stationary part 21 of the switch is attached by means of self-tapping screws 28, as shown, or by rivets or any other suitable fastening means. An insulating washer 29 may be interposed between the switch part 21 and the bearing cap 18, if desired. The switch part 21 is attached to the bearing cap 18 prior to assembly of the cap on the bracket, and when the bearing cap 18 is then pressed into place in the end bracket 4, after the bearing 10 has been inserted, the switch part 21 is simultaneously placed in its proper position. It will be seen that this construction eliminates the necessity of drilling and tapping the bracket for mounting screws for the switch, and eliminates the separate assembly operation of the switch which was previously necessary, thus effecting a material reduction in the cost of the motor, but without affecting its operation or performance, since the switch part 21 is supported in the same position relative to the rotating part of the switch as in the prior practice.

A specific embodiment of the invention has been shown and described for the purpose of illustration, but it will be apparent that various modifications may be made within the scope of the invention, and that it is applicable to internally mounted switches or control devices of any type and to motors of any type. It is to be understood therefore that the invention is not limited to the specific details of construction shown, but in its broadest aspects, it includes all equivalent embodiments and modifications which come within the scope of the appended claims.

I claim as my invention:

1. An electric motor having a stator member and a rotor member, bearing means on the stator member for supporting the rotor member for rotation, said bearing means including sealing means within the stator member for preventing the escape of lubricant from the bearing means, and a control device for the motor mounted on said sealing means.

2. An electric motor having a stator member and a rotor member, bearing means on the stator member for supporting the rotor member for rotation, said bearing means including a cap member within the stator member for preventing the escape of lubricant from the bearing means, and a control device for the motor mounted on said cap member.

3. An electric motor having a stator member and a rotor member, said stator member including a frame member, an end bracket at one end of the frame member, a bearing for the rotor member in said end bracket, sealing means for the bearing inside the end bracket to prevent the escape of lubricant from the bearing, and a control device for the motor mounted on said sealing means.

4. An electric motor having a stator member and a rotor member, said stator member including a frame member, an end bracket at one end of the frame member, a bearing for the rotor member in said end bracket, sealing means for the bearing inside the end bracket to prevent the escape of lubricant from the bearing, and speed-responsive switching means in the motor, said switching means including a stationary part mounted on said sealing means and a rotating part mounted for rotation with the rotor member.

5. An electric motor having a stator member and a rotor member, said stator member including a frame member, an end bracket at one end of the frame member, a bearing for the rotor member in said end bracket, a cap member for said bearing inside the end bracket for preventing the escape of lubricant from the bearing, and speed-responsive switching means in the motor, said switching means including a stationary part mounted on said cap member and a rotating part mounted for rotation with the rotor member.

HENRY J. BENDER.

No references cited.